United States Patent Office 3,026,320
Patented Mar. 20, 1962

3,026,320
DERIVATIVES OF CORTISONE AND HYDROCORTISONE
Carl Djerassi and John A. Zderic, Mexico City, Mexico, assignors to Syntex, S.A., Mexico City, Mexico, a corporation of Mexico
No Drawing. Filed Nov. 30, 1959, Ser. No. 856,008
Claims priority, application Mexico Nov. 28, 1958
7 Claims. (Cl. 260—239.55)

This invention relates to novel derivatives of cortisone and hydrocortisone, wherein one of the paired positions C–1,2 and C–6,7 constitutes an α-glycol grouping, and the other may also constitute an α-glycol grouping or may have an unsubstituted single or double carbon-to-carbon bond. Our invention also relates to the aforesaid derivatives substituted with halogen (fluorine, chlorine or bromine) at C–9α and/or with an α-hydroxyl, α-methyl or β-methyl group at C–16, as well as to their esters and ketals or acetals.

These new compounds which are an object of the present invention, are potent cortical hormones of anti-inflammatory, thymolytic, glycogenic, eosinopenic and catabolic activity. They are represented by the following general formulas:

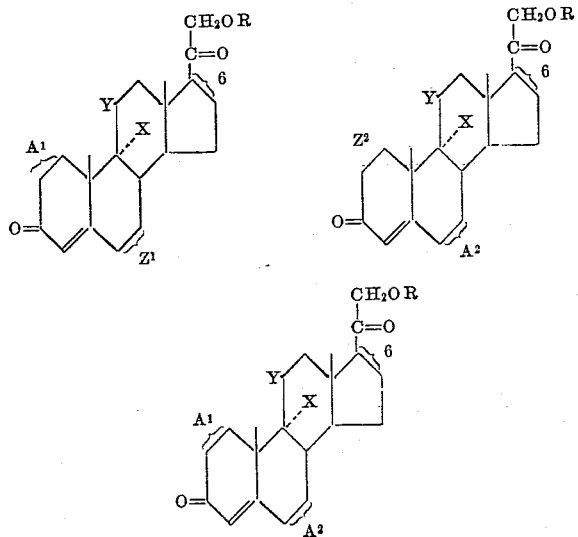

in which formulas $A^1$ and $A^2$ are members of the group consisting of

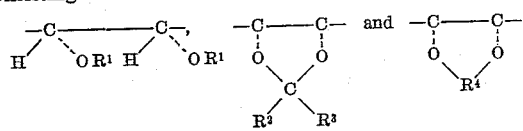

$Z^1$ and $Z^2$ are members of the group consisting of an unsubstituted single bond and an unsubstituted double bond;

G is selected from the groups consisting of

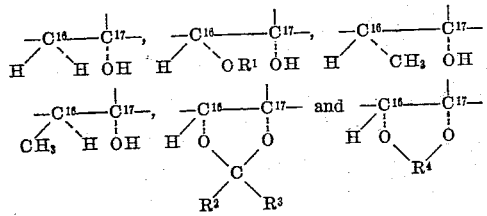

R and $R^1$ are members of the group consisting of hydrogen and the acyl radical of a hydrocarbon carboxylic acid having up to 12 carbon atoms; $R^2$ and $R^3$ are members selected from the group consisting of hydrogen and of hydrocarbon radicals having up to 8 carbon atoms, saturated or unsaturated, of straight, branched, cyclic, mixed straight-cyclic or mixed branched-cyclic, chain, aliphatic, aromatic or mixed aliphatic-aromatic, and these same hydrocarbon radicals substituted with at least one hydroxyl group, those substituted with an acyl group of a hydrocarbon carboxylic acid having up to 12 carbon atoms, those substituted with an alkoxy radical having up to 5 carbon atoms, and those substituted with a halogen selected from the group consisting of fluorine, chlorine and bromine; $R^4$ is a bivalent radical of a cyclic hydrocarbon; X is a member of the group consisting of hydrogen, fluorine, chlorine and bromine, and Y is selected from the group consisting of $$=O \text{ and } <^{OH}_{H}$$

The acyl groups are derived from carboxylic acids of 2 to 12 carbon atoms, saturated or unsaturated, of straight, branched, cyclic or mixed straight (branched)-cyclic chain, optionally substituted with functional groups such as hydroxyl, acyloxy (of 1 to 12 carbon atoms), alkoxy (of 1 to 5 carbon atoms) or halogen (F, Cl or Br); typical such esters are, among others, the acetate, propionate, butyrate, hemisuccinate, enanthate, caproate, benzoate, trimethylacetate, phenoxyacetate, phenylpropionate, cyclopentylpropionate and β-chloropropionate.

The methylenedioxy groups characterizing the cyclic ketals and acetals may be located at C–1,2 and/or C–6,7, and optionally also at C–16,17.

By reaction with cyclohexanone there is formed the cyclohexyl-ketal wherein $R^4$ represents the cyclohexyl groups.

Maximally, a hydrocarbon radical $R^2$, $R^3$ or $R^4$ when substituted can have 20 carbon atoms.

"Cortisol" is used hereinafter for hydrocortisone.

The new compounds of the present invention can be prepared according to a process as illustrated in the reaction diagrams given below. In these reaction diagrams $R^5$ is a member of the group consisting of

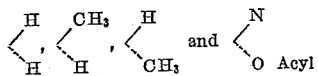

$R^6$ is a member of the group consisting of

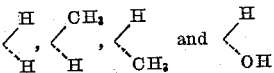

$R^7$ is a member of the group consisting of

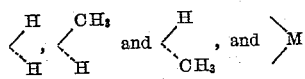

is a member of the group consisting of

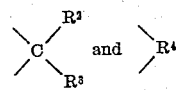

while R, $R^2$, $R^3$, $R^4$, X, Y, Z and "acyl" have the same meaning as explained hereinbefore.

REACTION DIAGRAM I
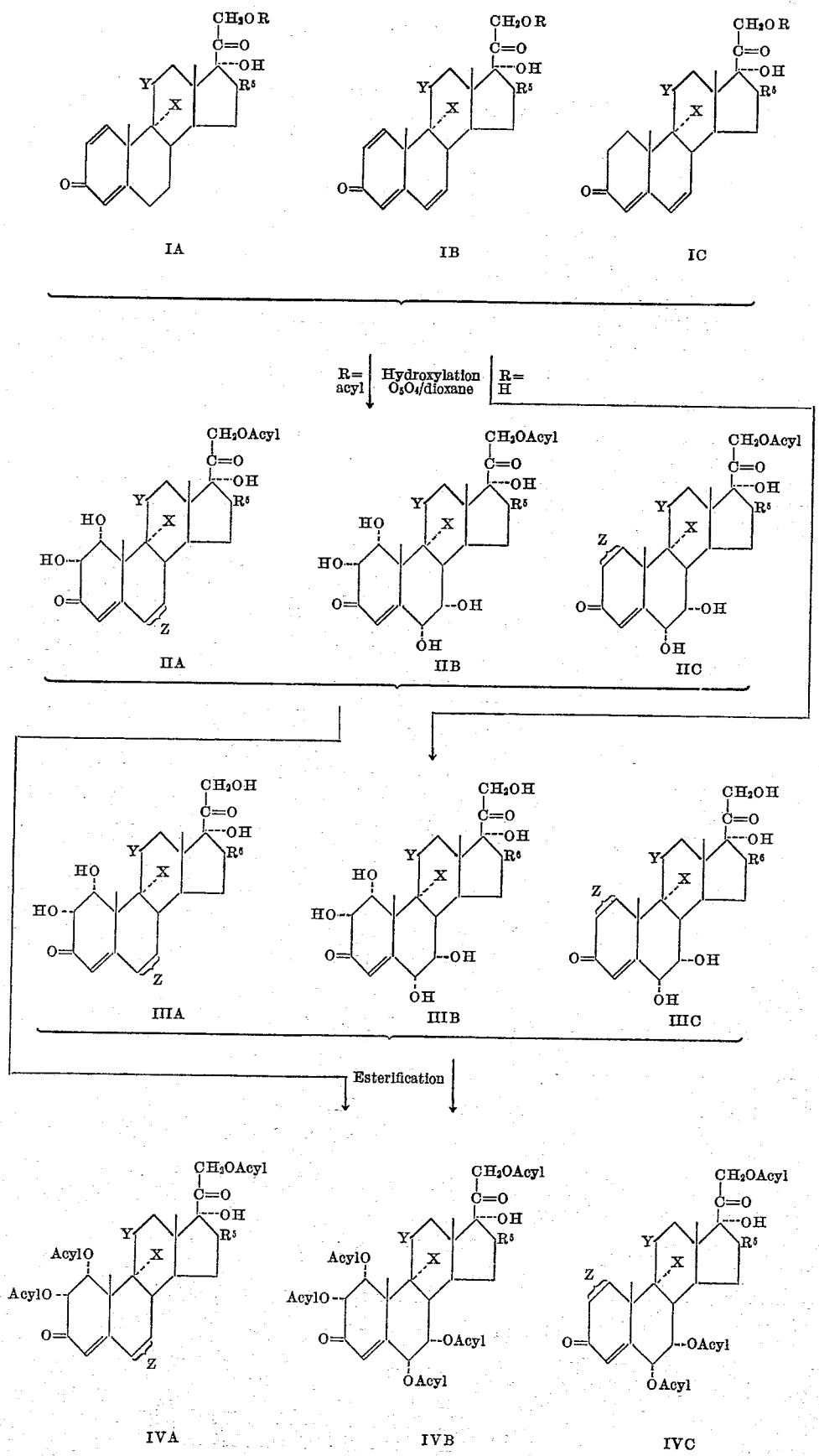

REACTION DIAGRAM II
(Z=single bond)
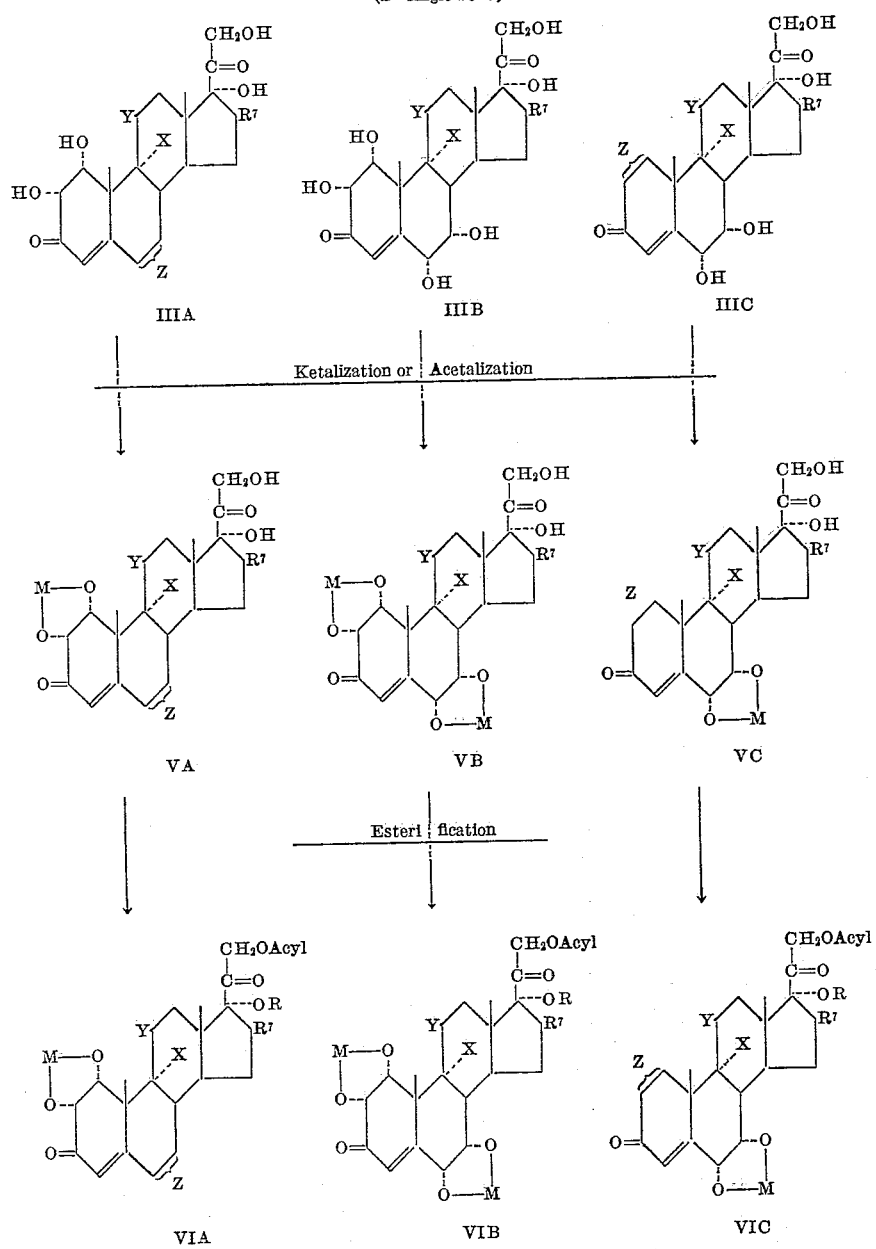
REACTION DIAGRAM III
(Z=double bond)
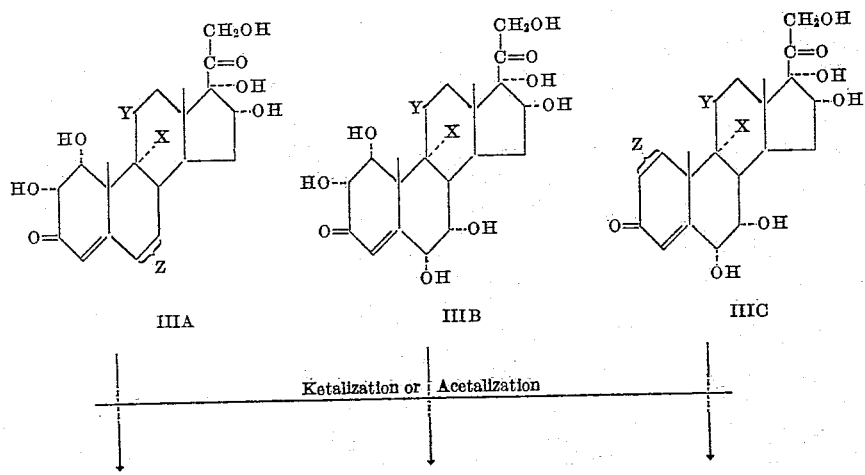

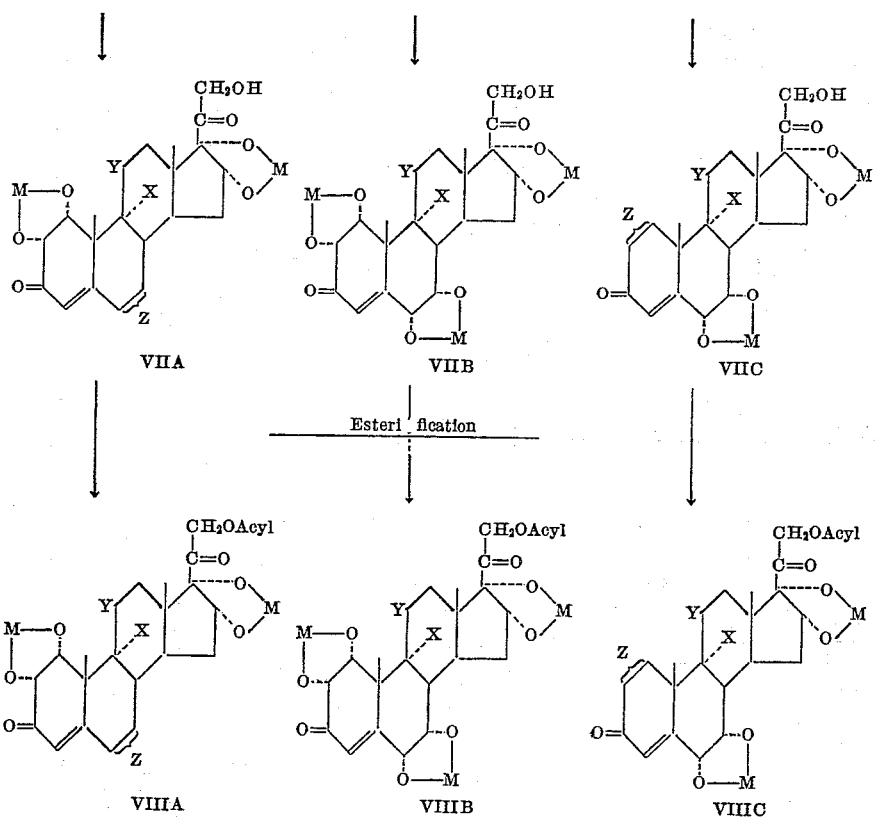

As can be seen from the above reaction diagrams, the process according to our invention comprises as an essential step the selective hydroxylation of a double bond other than the $\Delta^4$ bond of the free 21-hydroxyl derivatives or of the 21-esters of a given dehydro-cortical hormone namely the 1-dehydro-, the 6-dehydro- and the 1,6-bis-dehydro-cortisol and -cortisone derivatives, which reaction is carried out by treating the steroid with osmium tetroxide in mixture with dioxane, at low temperature for a prolonged period of time, followed by saturation of the mixture with hydrogen sulfide gas, elimination of the solid by filtration, evaporation of the filtrate and subsequent chromatography of the residue.

Instead of treating the intermediate osmic ester with hydrogen sulfide, it may be hydrolyzed by refluxing with sodium sulfite in an adequate solvent, such as dilute methanol.

Describing now Reaction Diagram I more in detail, the reaction of osmium tetroxide under the conditions as outlined above upon a 1-dehydro cortical hormone of formula IA in which R is acyl leads to the formation of a 1,2-glycol of the general formula IIAa in which Z is a single carbon-to-carbon bond.

The same treatment applied to the corresponding starting material IA in which R is hydrogen leads to the formation of the free 21-hydroxy compound IIIA, in which Z is a single carbon-to-carbon bond.

Esterification of the hydroxy groups is then effected by conventional methods and leads in both cases to triesters of general formula IVA in which Z is again a single bond.

The same reactions carried out with a 6-dehydrocorticoid (IC) as starting material yield first a 6,7-glycol with a free hydroxyl group at C-21 (IIICa) or the corresponding 21-ester IICa, depending on whether R in the starting material is hydrogen or acyl, in both of which formulas Z is a single carbon-to-carbon bond; and esterification of products IICa or IICa yields triesters of the formula IVC in which Z again is a single bond.

Thirdly, 1,6-bis-dehydro corticoids of the general formula IB in which R is hydrogen or acyl, used as starting materials in the above process step afforded a mixture of 1,2-glycols of formula IIAb or IIIAb in which Z is a carbon-to-carbon double bond, and 6,7-glycols of formula IICb or IIICb also with Z being such double bond.

Esterification of the latter compounds yields esters of formulas IVA and IVC respectively in both of which Z is a double bond.

On the other hand, when using a great excess of osmium tetroxide, in the order one and a half to two times the amount used in the above described reaction with 1,6-bis-dehydro-corticoids starting materials, and extending the reaction time from a few days, to, for instance, several weeks, there are obtained 1,2,6,7-bis-glycols (1,2,6,7-tetrahydroxy derivatives) having the general formula IIB, esterification of which bis-glycols yields esters of formula IVB.

To form the acetals and ketals, according to the process steps illustrated in Reaction Diagrams II and III from the free glycols IIIA, IIIB and IIIC, the latter are caused to react with the corresponding aldehydes or ketones, by a conventional method for the formation of acetals and ketals starting from α-glycols. We preferably employ a reaction of the steroid with the carbonyl compound in the presence of catalytic amounts of perchloric acid, in the presence or in the absence of a solvent. Thus we produce, among other ketals, those formed with acetone, methylethylketone, butanone and cyclohexanone, and among other acetals, those formed with formaldehyde, acetaldehyde, benzaldehyde and furfural.

More specifically, Reaction Diagram II shows that ketalization or acetalization of new compounds IIIAa, IIIBa and IIICa, in which the positions at C-16 are occupied by

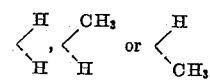

yield ketals or acetals at C-1,2 or C-6,7 or bis-ketals or bis-acetals at C-1,2; C-6,7 corresponding to general formulas VA, VC and VB, and conventional methods of esterification applied to the latter compounds yield their 21-esters VIA, VIC and VIB, respectively.

Reaction Diagram III, on the other hand illustrates the ketalization or acetalization of compounds IIIA$b$, IIIB$b$ and IIIC$b$, containing a free $\alpha$-hydroxyl group at C-16, whereby bis-acetals or bis-ketals at C-1,2; C-16,17 (formula VIIA) or C-6,7; C-16,17 (formula VIIC) or triacetals or triketals at C-1,2; C-6,7; C-16,17 of formula VIIB are obtained. These compounds VIIA, VIIB and VIIC are esterifiable by conventional methods at C-21 to their 21-esters VIIIA, VIIIB or VIIIC.

The respective double bonds may also be oxidized to $\alpha$-glycols by reaction with potassium permanganate, although the results of this reaction are inferior to those of the oxidation with osmium tetroxide. In order to adapt our process to an industrial scale, the quantity of osmium tetroxide required may be reduced to catalytic amounts by carrying out the hydroxylation step with hydrogen peroxide in the presence of osmium tetroxide. Furthermore, our process may be employed for preparing glycols of dehydro compounds having other substituents in addition to those mentioned hereinbefore, for example, of compounds having a fluorine atom at C-6.

In the above-described process, there can be used as starting materials novel corticoid intermediates having the general formula

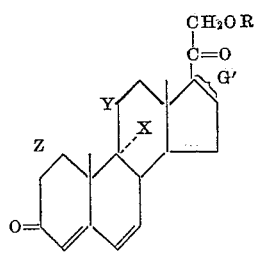

in which G' is selected from the group consisting of

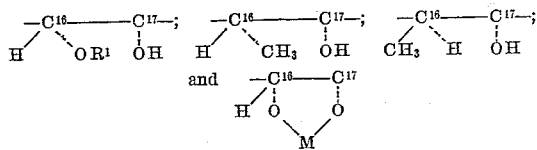

and wherein R, R$^1$, X, Y, Z and M have the same meaning as explained hereinbefore.

These new compounds which are another object of the present invention are valuable intermediates for the production of the new potent cortical hormones mentioned in the beginning of this application, and for many other important corticoids.

These new intermediates are produced from the corresponding ring B saturated corticoids, by a process illustrated in the following Reaction Diagram IV in which R$^8$ is selected from the group consisting of $\alpha$-OH, $\alpha$-OAcyl, $\alpha$-CH$_3$ and $\beta$-CH$_3$, while "Acyl," X and Y have the same meaning as explained hereinbefore:

REACTION DIAGRAM IV

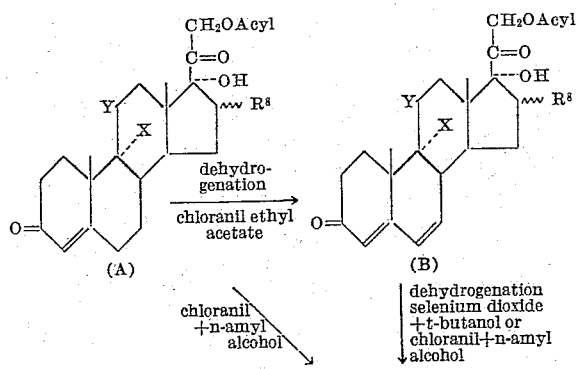

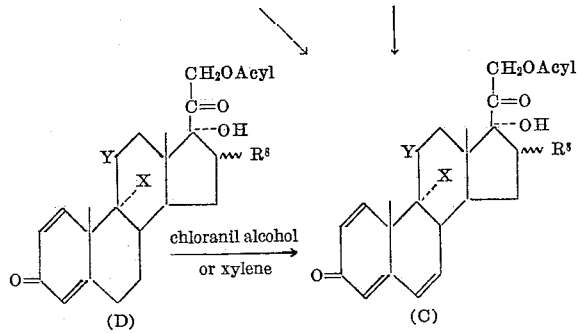

The preferred starting material in this latter process is one where "Acyl" represents the acetyl radical, as for example the 21-acetate where R$^8$ is CH$_3$, or 16,21-diacetate of the starting material where R$^8$ is OAcyl.

Refluxing the $\Delta^4$ starting corticoids (A) with chloranil in ethyl acetate or xylene produced the $\Delta^{4,6}$ derivation (B) which were transformed to the $\Delta^{1,4,6}$-derivatives (C) by a second treatment with chloranil in n-amyl alcohol, or by refluxing with selenium dioxide. These last compounds were also obtained directly from the $\Delta^4$ starting materials (A) by refluxing with chloranil in n-amyl alcohol.

Furthermore, refluxing the known $\Delta^{1,4}$ dienes (D) with chloranil in n-amyl alcohol or xylene also gave the corresponding $\Delta^{1,4,6}$-triene mono- or diacetates (C).

It is understood that other esters of the type previously set forth may be used instead of the acetates and the $\Delta^{4,6}$, $\Delta^{1,4}$ and $\Delta^{1,4,6}$ ester compounds prepared may be conventionally saponified and the resulting free compounds ketalized and acetalized, or re-esterified with the acyl radicals of other hydrocarbon carboxylic acids.

The above process steps are also described as applied to 6-chlorine substituted corticoid derivatives in patent application Serial No. 753,626, filed August 7, 1958.

The following specific preparations and examples serve to illustrate but are not intended to limit the present invention.

EXAMPLE I

A mixture of 5 g. of 16$\alpha$-methyl-cortisone 21-acetate described by Arth et al., in J. Am. Chem. Soc., 80, 3160 (1958), 10 g. of chloranil, 125 cc. of ethyl acetate and 25 cc. of acetic acid was refluxed under an atmosphere of nitrogen for 96 hours and poured into ice water. The organic phase was separated, washed with 10% aqueous sodium hydroxide solution until the washings were colorless, then with water, dried over anhydrous sodium sulfate and the solvent was evaporated; the residue was chromatographed on neutral alumina, thus giving 16$\alpha$-methyl-6-dehydro-cortisone 21-acetate.

A mixture of 3 g. of the above compound, 1 g. of selenium dioxide, 75 cc. of t-butanol and a few drops of pyridine was refluxed for 48 hours, filtered through celite and the solvent was evaporated. The residue was decolorized by refluxing in acetone solution with charcoal, filtered, evaporated to dryness and the crude product was purified by chromatography on neutral alumina. There was thus obtained 16$\alpha$-methyl-1,6-bis-dehydro-cortisone 21-acetate (16$\alpha$-methyl-6-dehydro-prednisone 21-acetate).

1 g. of the latter compound was mixed with 50 cc. of dilute methanolic potassium hydroxide and kept for 1 hour at 0° C. under an atmosphere of nitrogen, acidified with acetic acid, concentrated to about 10 cc. and poured into water; the precipitate was collected by filtration, washed with water, dried and recrystallized from acetone-hexane. There was thus obtained the free 16$\alpha$-methyl-1,6-bis-dehydro-cortisone.

EXAMPLE II

The method of the preceding example was applied to produce other 4,6-dienes and 1,4,6-trienes which may serve as starting compounds in the process of our present invention. For example, there were obtained the 6-dehydro and 1,6-bis-dehydro-derivatives II from the known corticoid compounds I as listed below.

| Known Compound I | Source | New Compound II |
|---|---|---|
| a. 16β-methyl-cortisone 21-acetate | Taub et al., J. Am. Chem. Soc., 80, 4435 (1958). | 16β-methyl-6-dehydro-cortisone 21-acetate and 1,6-bis-dehydro-derivative. |
| b. 16β-methyl-cortisol 21-acetate | _____do_____ | 16β-methyl-6-dehydro-cortisol 21-acetate and 1,6-bis-dehydro-derivative. |
| c. 16α-methyl-cortisol 21-acetate | Arth et al., J. Am. Chem. Soc., 80, 3160 (1958). | 16α-methyl-6-dehydro-cortisol 21-acetate and 1,6-bis-dehydro-derivative. |
| d. 16α-hydroxy-cortisone 16,21-diacetate. | Allen et al., J. Am. Chem. Soc., 78, 1909 (1956). | 16α-hydroxy-6-dehydro-cortisone 16,21-diacetate and 1,6-bis-dehydro derivative. |
| e. 16α-hydroxy-cortisol 16,21-diacetate. | _____do_____ | 16α-hydroxy-6-dehydro-cortisol 16,21-diacetate and 1,6-bis-dehydro derivative. |
| f. 16β-methyl-prednisone 21-acetate. | Taub et al., loc cit | 16β-methyl-6-dehydro-prednisone 21-acetate and 1,6-bis-dehydro derivative. |
| g. 16α-methyl-prednisone 21-acetate. | Arth et al., loc cit | 16α-methyl-6-dehydro-prednisone 21-acetate and 1,6-bis-dehydro derivative. |
| h. 16β-methyl-prednisolone 21-acetate. | Taub et al., loc cit | 16β-methyl-6-dehydro-prednisolone 21-acetate and 1,6-bis-dehydro derivative. |
| i. 16α-methyl-prednisolone 21-acetate. | Arth et al., loc cit | 16α-methyl-6-dehydro-prednisolone 21-acetate and 1,6-bis-dehydro derivative. |
| j. 16α-hydroxy-prednisone 16,21-diacetate. | U.S. Patent 2,806,043 | 16α-hydroxy-6-dehydro-prednisone 16,21-diacetate and 1,6-bis-dehydro derivative. |
| k. 16α-hydroxy-prednisolone 16,21-diacetate. | U.S. Patent 2,789,118 | 16α-hydroxy-6-dehydro-prednisolone 16,21-diacetate and 1,6-bis-dehydro derivative. |
| l. 16α-methyl-9α-fluoro-prednisolone 21-acetate. | Arth et al., J. Am. Chem. Soc., 80, 3161 (1958). | 16α-methyl-9α-fluoro-6-dehydro-prednisolone 21-acetate and 1,6-bis-dehydro derivative. |
| m. 16α-hydroxy-9α-fluoro-cortisol 16,21-diacetate. | Bernstein et al., J. Am. Chem. Soc., 78, 5693 (1956). | 16α-hydroxy-9α-fluoro-6-dehydro-cortisol 16,21-diacetate and 1,6-bis-dehydro derivative. |
| n. 16α-hydroxy-9α-chloro-cortisol 16,21-diacetate. | _____do_____ | 16α-hydroxy-9α-chloro-6-dehydro-cortisol 16,21-diacetate and 1,6-bis-dehydro derivative. |
| o. 16α-hydroxy-9α-bromo-cortisol 16,21-diacetate. | _____do_____ | 16α-hydroxy-9α-bromo-6-dehydro-cortisol 16,21-diacetate and 1,6-bis-dehydro derivative. |
| p. 16α-methyl-9α-bromo-cortisone 21-acetate. | Produced as described below in Preparation I. | 16α-methyl-9α-bromo-6-dehydro-cortisone 21-acetate and 1,6-bis-dehydro derivative. |
| q. 16α-methyl-9α-chloro-cortisone 21-acetate. | Produced as described below in Preparation II. | 16α-methyl-9α-chloro-6-dehydro-cortisone 21-acetate and 1,6-bis-dehydro derivative. |
| r. 16α-methyl-9α-fluoro-cortisone 21-acetate. | Produced as described below in Preparation III. | 16α-methyl-9α-fluoro-6-dehydro-cortisone 21-acetate and 1,6-bis-dehydro-derivative. |
| s. 16α-methyl-9α-bromo-cortisol 21-acetate. | Arth et al., J. Am. Chem. Soc., 80, 3161 (1958). | 16α-methyl-9α-bromo-6-dehydro-cortisol 21-acetate and 1,6-bis-dehydro derivative. |
| t. 16α-methyl-9α-chloro-cortisol 21-acetate. | _____do_____ | 16α-methyl-9α-chloro-6-dehydro-cortisol 21-acetate and 1,6-bis-dehydro derivative. |
| u. 16α-methyl-9α-fluoro-cortisol 21-acetate. | _____do_____ | 16α-methyl-9α-fluoro-6-dehydro-cortisol 21-acetate and 1,6-bis-dehydro derivative. |
| v. 16β-methyl-9α-bromo-cortisol 21-acetate. | Produced as described below in Preparation IV. | 16β-methyl-9α-bromo-6-dehydro-cortisol 21-acetate and 1,6-bis-dehydro derivative. |
| w. 16β-methyl-9α-chloro-cortisol 21-acetate. | _____do_____ | 16β-methyl-9α-chloro-6-dehydro-cortisol 21-acetate and 1,6-bis-dehydro derivative. |
| x. 16β-methyl-9α-fluoro-cortisol 21-acetate. | _____do_____ | 16β-methyl-9α-fluoro-6-dehydro-cortisol 21-acetate and 1,6-bis-dehydro derivative. |
| y. 16β-methyl-9α-bromo-cortisone 21-acetate. | _____do_____ | 16β-methyl-9α-bromo-6-dehydro-cortisone 21-acetate and 1,6-bis-dehydro derivative. |
| z. 16β-methyl-9α-chloro-cortisone 21-acetate. | _____do_____ | 16β-methyl-9α-chloro-6-dehydro-cortisone 21-acetate and 1,6-bis-dehydro derivative. |
| z'. 16β-methyl-9α-fluoro-cortisone 21-acetate. | _____do_____ | 16β-methyl-9α-fluoro-6-dehydro-cortisone 21-acetate and 1,6-bis-dehydro derivative. |

*Preparation I*

A solution of 1 g. of 16α-methyl-9α-bromo-hydrocortisone 21-acetate, described by Arth et al., in J. Am. Chem. Soc., 80, 3161 (1958) in 30 cc. of acetic acid was slowly treated, under stirring and maintaining the temperature below 20° C., with a solution of 150 mg. of chromium trioxide in 6 cc. of 80% acetic acid. The mixture was kept at room temperature for 2 hours, poured into ice water and the precipitate was filtered, washed with water, dried and recrystallized from acetone-hexane. There was thus obtained 16α-methyl-9α-bromo-cortisone 21-acetate.

*Preparation II*

16α-methyl-9α-chloro-cortisol 21-acetate described by Arth et al., supra is treated as described in Preparation I and there is obtained 16α-methyl-9α-chloro-cortisone 21-acetate and 16α-methyl-9α-chloro-cortisone used as starting material in Example II(q) above.

*Preparation III*

16α-methyl-9α-fluoro-cortisol 21-acetate described by Arth et al., supra is treated as described in Preparation I and there is obtained 16α-methyl-9α-fluoro-cortisone 21-acetate used as starting material in Example II(r) above.

*Preparation IV*

10 g. of 16β-methyl-cortisol 21-acetate (J. Am. Chem. Soc., 80, 4435 (1958)) was dissolved with slight heating in 125 cc. of dimethylformamide, cooled, treated with 4.2 cc. of mesyl chloride and heated at 80° C., for half an hour. The cooled mixture was poured into water and the organic layer was separated, washed with water, dried over anhydrous sodium sulfate and evaporated to dryness. The residue was purified by recrystallization from acetone-hexane, thus giving 16β-methyl-$\Delta^{4,9(11)}$-pregnadien-17α,21-diol-3,20-dione 21-acetate.

7.5 g. of the above diene was mixed with 75 cc. of pure dioxane containing 12 cc. of 0.4 N perchloric acid. This mixture was treated in the dark with 4.2 g. of N-bromoacetamide which was added at room temperature in the course of 1 hour. The mixture was stirred for 1 hour further, treated with 10% sodium sulfite solution until the starch-potassium iodide paper no longer showed a blue color. Ice and 120 cc. of chloroform were added and the organic layer was washed with water, sodium bicarbonate solution and water. The extract was then evaporated under reduced pressure in a bath kept at a temperature below 25° C. Upon trituration of the residue with acetone and cooling, there was obtained the crystalline 16β-methyl-9α-bromo-cortisol 21-acetate.

Concentration of the mother liquors afforded an additional crop of such compound.

A solution of 5.0 g. of 16β-methyl-9α-bromocortisol 21-acetate in 10 cc. of dioxane was slowly added to a mixture of 1.6 g. of anhydrous potassium acetate and 20 cc. of absolute ethanol which was heated near to the boiling point. The mixture was refluxed for 45 minutes, cooled and treated with 50 cc. of ice water, with stirring. The precipitate was filtered, washed with water and dried. There was thus obtained 16β-methyl-9β,11β-oxido-Δ⁴-pregnen-17α,21-diol-3,20-dione 21-acetate.

4 g. of the above epoxide was dissolved in 40 cc. of pure chloroform, cooled to 0° C., and treated at this temperature and under stirring with 8 cc. of a 0.5 N solution of dry hydrogen chloride in chloroform. The mixture was stirred at 0° C. for 1 hour and then water was added and the chloroform layer was washed with water, 5% sodium carbonate solution and water, dried over anhydrous sodium sulfate and evaporated to dryness under reduced pressure. The residue crystallized from acetone, thus giving 16β-methyl-9α-chloro-cortisol-21-acetate.

In a polyethylene flask fitted with a magnetic stirrer there was dissolved 5 g. of 16β-methyl-9β,11β-oxido-Δ⁴-pregnen-17α,21-diol-3,20-dione 21-acetate, obtained as described above, in 80 cc. of pure chloroform and cooled to 0° C.; while the temperature was kept below 0° C., and under continuous stirring there was then added 0.8 g. of anhydrous hydrogen fluoride, in the course of 20 minutes. The stirring was continued for 2 hours further and the mixture was then neutralized by the cautious addition of an aqueous suspension of sodium bicarbonate.

The mixture was transferred to a separatory funnel, washed with water and the organic layer was concentrated under reduced pressure until a bulky crystalline precipitate formed. After cooling, the precipitate was collected, redissolved in 20 cc. of hot ethyl acetate, filtered from the insoluble material and cooled. There was thus obtained 16β-methyl-9α-fluoro-cortisol 21-acetate.

Oxidation of the 11-hydroxyl group with chromium trioxide as described above in Preparation I, II and III for the 16α-methyl series gave the corresponding keto analogs:

16β-methyl-9α-bromo-cortisone acetate
16β-methyl-9α-chloro-cortisone acetate
16β-methyl-9α-fluoro-cortisone acetate.

EXAMPLE III

A solution of 1.73 g. of the 21-acetate of 6-dehydro-cortisone, described by Mattox et al., in J. Biol. Chem. 197, 261 (1952), in 50 cc. of dioxane was treated with 1.0 g. of osmium tetroxide and kept for 5 days in the dark at room temperature. A slow stream of dry hydrogen sulfide was then introduced into the solution until saturation, and then it was filtered through celite, washing the filter with dioxane, and the combined filtrate and washings was evaporated to dryness. The residue was dissolved in methylene chloride, adsorbed in a column of 35 g. of florisil and eluted with methylene chloride-acetone (1:1) and then with acetone, whereupon solid fractions were obtained. Recrystallization from methanol-ethyl acetate afforded the 21-acetate of 6α,7α-dihydroxy-cortisone; M.P. 266–269° C. (dec.); $[\alpha]_D + 158°$ (chloroform)

$\lambda_{max.}^{EtOH}$ 240 m$\mu$, log $\epsilon$ 4.12

1 g. of the latter compound was mixed with 50 cc. of dilute methanolic potassium hydroxide and kept for 1 hour at 0° C. under an atmosphere of nitrogen, acidified with acetic acid, concentrated to about 10 cc. and poured into water; the precipitate was collected by filtration, washed with water, dried and recrystallized from acetone-hexane. There was thus obtained the free 6α,7α-dihydroxy-cortisone.

EXAMPLE IV

A solution of 1.65 g. of the 21-acetate of 6-dehydro-prednisone, described by Hershberg and co-workers in J. Am. Chem. Soc., 75, 4862 (1958) in 100 cc. of dioxane was treated with 1.0 g. of osmium tetroxide, kept at room temperature in the dark for 4 days and then the crude product was isolated as described in the preceding example. The latter was adsorbed in 60 g. of florisil and the solid fractions eluted with methylene chloride-acetone (1:1) were recrystallized several times from methanol; there was thus obtained the 21-acetate of 6α,7α-dihydroxy-prednisone; M.P. 290–292° C.; $[\alpha]_D + 109°$ (pyridine)

$\lambda_{max.}^{EtOH}$ 238 m$\mu$, log $\epsilon$ 4.12

The mother liquor was chromatographed on 6 g. of florisil and the fractions obtained by elution with methylene chloride-acetone (9:1) were recrystallized from acetone, thus furnishing the 21-acetate of 1α,2α-dihydroxy-6-dehydro-cortisone.

EXAMPLE V

A mixture of 5 g. of 6-dehydro-prednisolone, described by Gould et al., in J. Am. Chem. Soc., 79, 502 (1957), 20 cc. of pyridine and 20 cc. of propionic anhydride was allowed to stand at room temperature for 4 hours, poured into ice water, the precipitate was collected and recrystallized from methylene chloride methanol, thus yielding the 21-propionate of 6-dehydro-prednisolone.

Thereafter, by following the procedure described in Example III, 3 g. of the aforesaid 21-propionate of 6-dehydro-prednisolone was treated with 3 g. of osmium tetroxide for a period of 3 weeks, to produce finally the 21-propionate of 1α,2α,6α,7α-tetrahydroxy-cortisol.

EXAMPLE VI

In accordance with the method of Example III, the 21-benzoate of 9α-fluoro-prednisolone, described in Patent No. 2,837,541 was converted into the 21-benzoate of 9α-fluoro-1α,2α-dihydroxy-cortisol.

EXAMPLE VII

In accordance with the method described in Example III, 5 g. of the 16,21-diacetate of 9α-fluoro-16α-hydroxy-prednisone, described by Bernstein et al., in J. Am. Chem. Soc., 78, 5693 (1956) was converted to the 16,21-diacetate of 9α-fluoro-1α,2α,16α-trihydroxy-cortisone.

500 mg. of the above compound was suspended in 20 cc. of acetone, treated under continuous stirring with a few drops of 50% perchloric acid, was stirred for half an hour; after diluting with saturated sodium chloride solution the precipitate was collected, washed with a little cold water and dried. By chromatography on silica gel there was obtained the 1,2-acetonide 16,21-diacetate of 9α-fluoro-1α,2α,16α-trihydroxy-cortisone.

EXAMPLE VIII

A mixture of 800 mg. of 6α,7α-dihydroxy-cortisone obtained as described in Example III, and 10 cc. of benzaldehyde was treated with perchloric acid and the product isolated in accordance with the procedure described for this reaction in such example, to produce 6α,7α-phenylmethylenedioxy - Δ⁴ - pregnene-17α,21-diol-3,11,20-trione (6,7 - (benzaldehyde) - acetal of 6α,7α-dihydroxy-cortisone).

By conventional esterification methods, using acetic anhydride in pyridine, there was then obtained the 21-acetate of the 6,7-(benzaldehyde)-acetal of 6α,7α-dihydroxy-cortisone.

EXAMPLE IX

A mixture of 1 g. of the 21-propionate of 1α,2α,6α,7α-tetrahydroxy-cortisone prepared as described in Example V, 10 cc. of pyridine and 2 cc. of acetic anhydride was allowed to react overnight to produce, after the usual work up, 1α,2α,6α,7α-tetraacetoxy-21-propionoxy-Δ⁴-pregnen-17α-ol-3,11,20-trione.

EXAMPLE X

A mixture of 1 g. of 6α,7α-dihydroxy-cortisone 21-acetate, obtained as described in Example III, 50 cc. of benzene and 5 g. of paraldehyde was treated with 5 drops of perchloric acid and kept at room temperature for 2 hours. After pouring into 200 cc. of water the organic layer was separated, washed with 5% aqueous sodium bicarbonate solution and water, dried over anhydrous sodium sulfate and the benzene was evaporated. Chromatography of the residue on neutral alumina afforded 6α,7α-methylenedioxy-cortisone, namely the 6α,7α-formaldehyde-acetal of 6α,7α-dihydroxy-cortisone 21-acetate.

EXAMPLE XI

In accordance with the method of Example III, the 21-acetate of 6-dehydro-cortisol described by Agnello et al., in J. Am. Chem. Soc., 79, 1258 (1957), was converted into the 21-acetate of 6α,7α-dihydroxy-cortisol and the acetoxy group of this compound was hydrolyzed in accordance with the method of hydrolysis described in Example III.

A solution of 500 mg. of the resulting free 6α,7α-dihydroxy-cortisol in 50 cc. of cyclohexanone was treated with 5 drops of perchloric acid, stirred at room temperature for 2 hours and diluted with 50 cc. of 5% aqueous sodium bicarbonate solution. The organic layer was separated, the aqueous phase was extracted with ether and the organic extracts were combined, washed with saturated aqueous sodium chloride solution dried over anhydrous sodium sulfate and the solvents were evaporated, finally under reduced pressure. By chromatography of the residue on neutral alumina there was obtained 6α,7α-cyclohexylidenedioxy-cortisol, namely, the 6α,7α-cyclohexanone-ketal of 6α,7α-dihydroxy-cortisol.

By treatment with benzoic anhydride in pyridine solution, there was obtained the 21-benzoate of 6α,7α-cyclohexylidenedioxy-cortisol.

EXAMPLE XII 1.4 g. of the 21-acetate of prednisolone is treated with 1.5 g. of chloranil and 20 cc. of n-amyl alcohol under reflux for 16 hours, cooled and diluted with 60 cc. of ether. The ether solution was successively washed with water, 5% sodium carbonate solution and again with water, dried over anhydrous sodium sulfate, filtered and evaporated to dryness under reduced pressure. Chromatography of the residue on neutral alumina furnished the 21-acetate of 6-dehydro-prednisolone (1,6-bis-dehydro-cortisol).

The latter was then treated by the method described in Example IV, and there were obtained the 21-acetate of 6α,7α-dihydroxy-prednisolone, and, by chromatography of the mother liquor, as described in the aforesaid Example IV, the 21-acetate of 1α,2α-dihydroxy-6-dehydro-cortisol.

Saponification of the former of these acetates by the method described in Example I afforded the free 6α,7α-dihydroxy-prednisolone.

EXAMPLE XIII

Example III is repeated with the 21-acetate of prednisone to yield 1α,2α-dihydroxy-cortisone 21-acetate.

EXAMPLE XIV

Example IV is repeated with prednisolone to yield 1α,2α-dihydroxy-cortisol.

EXAMPLE XV

Example IV is repeated with the 21-acetate of prednisolone to yield 1α,2α-dihydroxi-cortisol 21-acetate.

EXAMPLE XVI

Example V is repeated with 6-dehydro-prednisone as the starting material; there is prepared the 21-acetate of the same, and further treatment by the method described in detail in Example III, for a period of 25 days, and at a temperature of +20° C., yields 1α,2α,6α,7α-tetrahydroxy-cortisone 21-acetate.

EXAMPLE XVII

By treating 6α,7α-dihydroxi-prednisone 21-acetate by the saponification step described in Example I, there was obtained 6α,7α-dihydroxy-prednisone.

We claim:

1. A process for producing an α-glycol derivative of a cortical hormone, comprising the steps of reacting a starting compound selected from the group of compounds consisting of those having the general formulas:

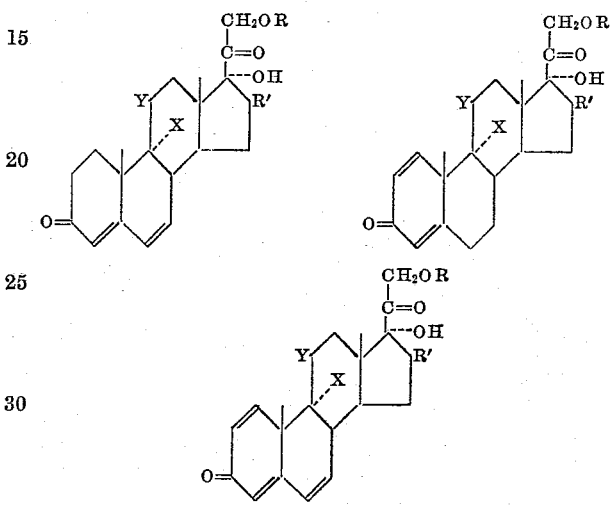

wherein R is a member of the group consisting of hydrogen and the acyl radical of a hydrocarbon carboxylic acid having up to 12 carbon atoms; R' is a member of the group consisting of

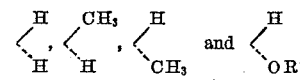

X is a member of the group consisting of hydrogen, fluorine, chlorine, and bromine, and Y is selected from the group consisting of

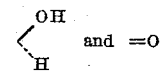

with osmium tetroxide in mixture with dioxane at a temperature up to room temperature for from about 4 days to several weeks, the molar ratio of osmium tetroxide to hormone varying from about 1:1 to about 1:2 and lower, saturating the mixture with gaseous hydrogen sulfide, and isolating the resulting crudle α-glycol product.

2. A compound having the general formula

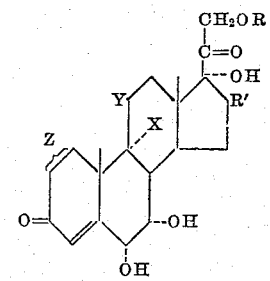

wherein R is a member of the group consisting of hydrogen and the acyl radical of a hydrocarbon carboxylic acid having up to 12 carbon atoms; R' is a member of the group consisting of

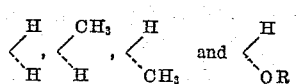

X is a member of the group consisting of hydrogen, fluorine, chlorine, and bromine, and Y is selected from the group consisting of

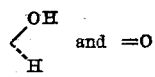

and Z is selected from the group consisting of C—C and C=C.

3. A compound having the present formula:

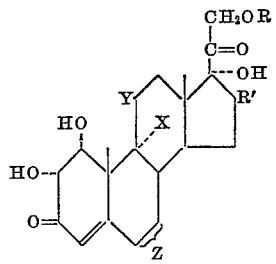

wherein R is a member of the group consisting of hydrogen and the acyl radical of a hydrocarbon carboxylic acid having up to 12 carbon atoms; R' is a member of the group consisting of

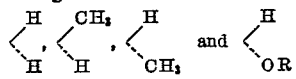

X is a member of the group consisting of hydrogen, fluorine, chlorine and bromine, and Y is selected from the group consisting of

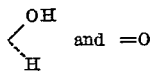

and Z is selected from the group consisting of C—C and C=C.

4. A compound having the present formula:

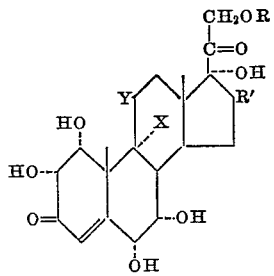

wherein R is a member of the group consisting of hydrogen and the acyl radical of a hydrocarbon carboxylic acid having up to 12 carbon atoms; R' is a member of the group consisting of

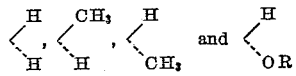

X is a member of the group consisting of hydrogen, fluorine, chlorine and bromine, and Y is selected from the group consisting of

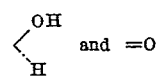

5. A compound of the following formula:

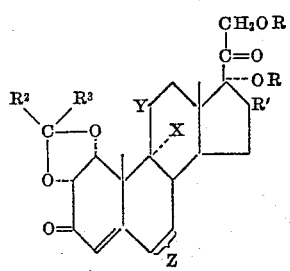

wherein R is selected from the group consisting of hydrogen and a hydrocarbon carboxylic acyl group of up to 12 carbon atoms, R' is selected from the group consisting of

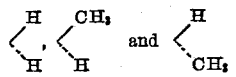

X is selected from the group consisting of hydrogen, fluorine, chlorine, and bromine, Y is selected from the group consisting of

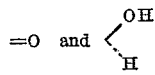

Z is selected from the group consisting of C—C and C=C, $R^2$ and $R^3$ are each selected from the group consisting of hydrogen and a hydrocarbon radical of up to eight carbon atoms and both $R^2$ and $R^3$ may form part of a cyclic hydrocarbon of up to eight carbon atoms.

6. A compound of the following formula:

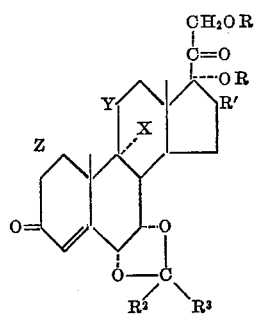

wherein R is selected from the group consisting of hydrogen and a hydrocarbon carboxylic acyl group of up to 12 carbon atoms, $R^1$ is selected from the group consisting of

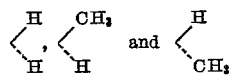

X is selected from the group consisting of hydrogen, fluorine, chlorine, and bromine, Y is selected from the group consisting of

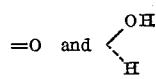

Z is selected from the group consisting of C—C and C=C, $R^2$ and $R^3$ are each selected from the group consisting of hydrogen and a hydrocarbon radical of up to eight carbon atoms and both $R^2$ and $R^3$ may form part of a cyclic hydrocarbon of up to eight carbon atoms.

7. A compound of the following formula:

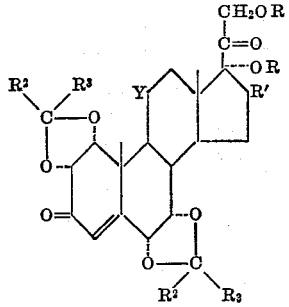

wherein R is selected from the group consisting of hydrogen and a hydrocarbon carboxylic acyl group of up to 12 carbon atoms, $R^1$ is selected from the group consisting of

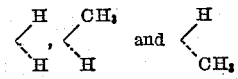

X is selected from the group consisting of hydrogen, fluorine, chlorine and bromine, Y is selected from the group consisting of

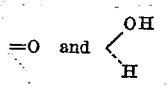

Z is selected from the group consisting of C—C and C=C, $R^2$ and $R^3$ are each selected from the group consisting of hydrogen and a hydrocarbon radical of up to eight carbon atoms and both $R^2$ and $R^3$ may form part of a cyclic hydrocarbon of up to eight carbon atoms.

References Cited in the file of this patent

UNITED STATES PATENTS 2,879,279    Van der Burg    Mar. 24, 1959
2,882,282    Angello et al.    Apr. 14, 1959

OTHER REFERENCES

Iriarte et al.: 80, J.A.C.S., 6105–6110 (1958).
Hirschmann et al.: 81, J.A.C.S., 2822–26 (1959).
Zderic et al.: J. Org. Chem., vol. 24, No. 7, pages 909–11, (1959).

CERTIFICATE OF CORRECTION

Patent No. 3,026,320                                                March 20, 1962

Carl Djerassi et al.

It is hereby certified that error appears in the above numbered patent requiring correction and that the said Letters Patent should read as corrected below.

Column 1, lines 26 to 48, the formulas should appear as shown below instead of as in the patent:

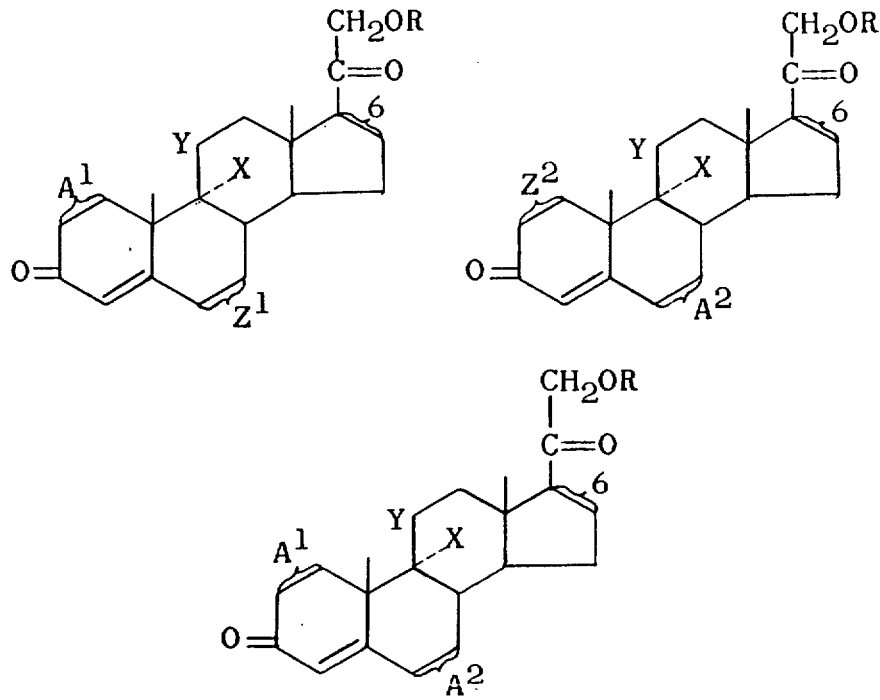

columns 5 and 6, formula VC should appear as shown below instead of as in the patent:

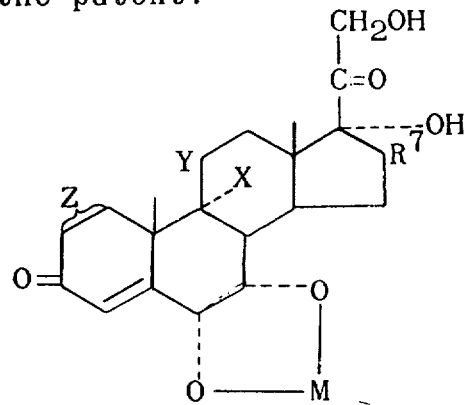

column 9, lines 25 to 35, the formula should appear as shown below instead of as in the patent:

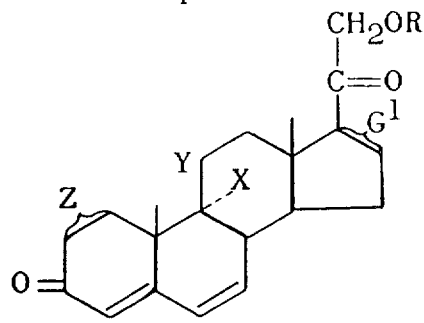

column 18, lines 21 to 34, the formula should appear as shown below instead of as in the patent:

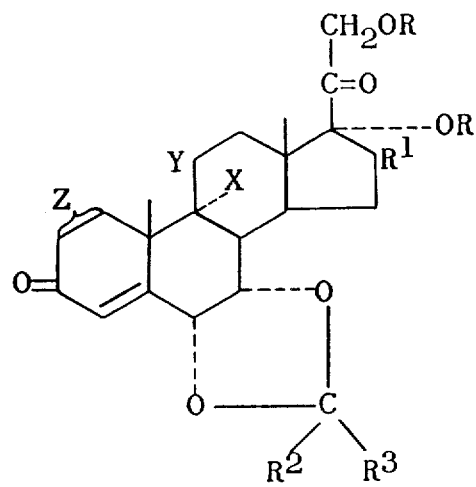

Signed and sealed this 24th day of July 1962.

(SEAL)
Attest:

ERNEST W. SWIDER
Attesting Officer

DAVID L. LADD
Commissioner of Patents